United States Patent
Jensen et al.

(10) Patent No.: US 11,454,323 B2
(45) Date of Patent: Sep. 27, 2022

(54) SEALING SYSTEM FOR A MOVING SHAFT

(71) Applicant: CNH Industrial America LLC, New Holland, PA (US)

(72) Inventors: Michael Jensen, Lockport, IL (US); Daniel Payne, Westmont, IL (US)

(73) Assignee: CNH Industrial America LLC, New Holland, PA (US)

( * ) Notice: Subject to any disclaimer, the term of this patent is extended or adjusted under 35 U.S.C. 154(b) by 617 days.

(21) Appl. No.: 16/209,398

(22) Filed: Dec. 4, 2018

(65) Prior Publication Data
US 2020/0173559 A1    Jun. 4, 2020

(51) Int. Cl.
| | |
|---|---|
| *F16J 15/3264* | (2016.01) |
| *F16J 15/34* | (2006.01) |
| *F16J 15/36* | (2006.01) |
| *F16J 15/52* | (2006.01) |
| *B60B 35/16* | (2006.01) |
| *B62D 49/00* | (2006.01) |

(52) U.S. Cl.
CPC ....... *F16J 15/3264* (2013.01); *F16J 15/3456* (2013.01); *F16J 15/36* (2013.01); *F16J 15/52* (2013.01); *F16J 15/525* (2013.01); *B60B 35/16* (2013.01); *B60B 2900/511* (2013.01); *B60G 2206/31* (2013.01); *B60G 2300/082* (2013.01); *B60Y 2200/221* (2013.01); *B62D 49/00* (2013.01); *F16C 2326/05* (2013.01)

(58) Field of Classification Search
CPC .. F16J 15/3264; F16J 15/3456; F16J 15/3268; F16J 15/3248; F16J 15/3252; F16J 15/525; F16J 15/52; B60B 36/16; B60B 35/16

See application file for complete search history.

(56) References Cited

U.S. PATENT DOCUMENTS

| | | | | |
|---|---|---|---|---|
| 2,984,506 | A | * | 5/1961 | Andresen ................. F16J 15/36 277/371 |
| 3,743,306 | A | * | 7/1973 | Kramer ..................... F16J 15/52 277/503 |
| 4,502,698 | A | * | 3/1985 | Collins ..................... F16J 15/36 277/379 |
| 4,750,751 | A | * | 6/1988 | Schafer ................ A01D 75/285 180/41 |
| 4,793,242 | A | * | 12/1988 | Kobayashi ........... F16J 15/3268 92/168 |
| 4,968,044 | A | * | 11/1990 | Petrak .................. F16J 15/3204 277/380 |
| 5,199,720 | A | | 4/1993 | Radosav et al. |
| 5,380,016 | A | | 1/1995 | Reinsma et al. |
| 6,371,487 | B1 | | 4/2002 | Cimbura, Sr. |

(Continued)

*Primary Examiner* — Christine M Mills
*Assistant Examiner* — L. Susmitha Koneru
(74) *Attorney, Agent, or Firm* — Rickard K. DeMille; Rebecca L. Henkel

(57) ABSTRACT

A sealing system includes a shaft seal plate, a seal guide having a tab, and a shaft seal coupled to the seal guide. A guide slot is formed in the shaft seal plate, and the tab extends into the guide slot. The shaft seal is configured to form and substantially maintain a seal at an axle bar as the axle bar rotates and pivots. The seal guide is configured to translate relative to the shaft seal plate as the axle bar pivots, and the tab is configured to block a rotation of the seal guide and the shaft seal relative to the shaft seal plate as the axle bar rotates.

18 Claims, 6 Drawing Sheets

(56) References Cited

U.S. PATENT DOCUMENTS

| | | | | |
|---|---|---|---|---|
| 6,866,271 | B2* | 3/2005 | MacDonald | F16J 15/3276 |
| | | | | 277/353 |
| 7,857,320 | B1* | 12/2010 | Chang | F16J 15/3456 |
| | | | | 277/389 |
| 8,794,634 | B1 | 8/2014 | Wright et al. | |
| 9,546,734 | B2 | 1/2017 | Cid et al. | |
| 9,702,463 | B2 | 7/2017 | Ikebukuro et al. | |
| 2003/0006563 | A1* | 1/2003 | Cater | F16J 15/3456 |
| | | | | 277/549 |
| 2004/0200681 | A1 | 10/2004 | Forster | |
| 2016/0040785 | A1 | 2/2016 | Hermanski | |
| 2019/0056030 | A1* | 2/2019 | Iguchi | F16J 15/34 |

* cited by examiner

SEALING SYSTEM FOR A MOVING SHAFT

BACKGROUND

The present disclosure relates generally to a sealing system for a moving shaft.

Generally, a work vehicle includes a driveline and wheels that enable the work vehicle to travel across terrain and to support a weight of the work vehicle. The driveline generally includes an axle shaft connecting the work vehicle to a wheel. In certain work vehicles, a spacing between wheels is adjustable. The axle shaft is connected to an axle housing that is rigidly connected to a frame of the work vehicle. The axle shaft is configured to rotate to transfer motion of a drivetrain to the wheel, thereby enabling the work vehicle to travel across the terrain. The work vehicle may travel across various types of terrain, such as uneven field surfaces, paved roads, and other types of terrain. As the work vehicle travels across such terrain, the rigidly connected axle housing may transfer forces associated with movement of the wheel to other portions of the work vehicle, including a cab. This may reduce traction at the wheel and may reduce occupant comfort in the cab.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, a sealing system includes a shaft seal plate, a seal guide having a tab, and a shaft seal coupled to the seal guide. A guide slot is formed in the shaft seal plate, and the tab extends into the guide slot. The shaft seal is configured to form and substantially maintain a seal at an axle bar as the axle bar rotates and pivots. The seal guide is configured to translate relative to the shaft seal plate as the axle bar pivots, and the tab is configured to block a rotation of the seal guide and the shaft seal relative to the shaft seal plate as the axle bar rotates.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
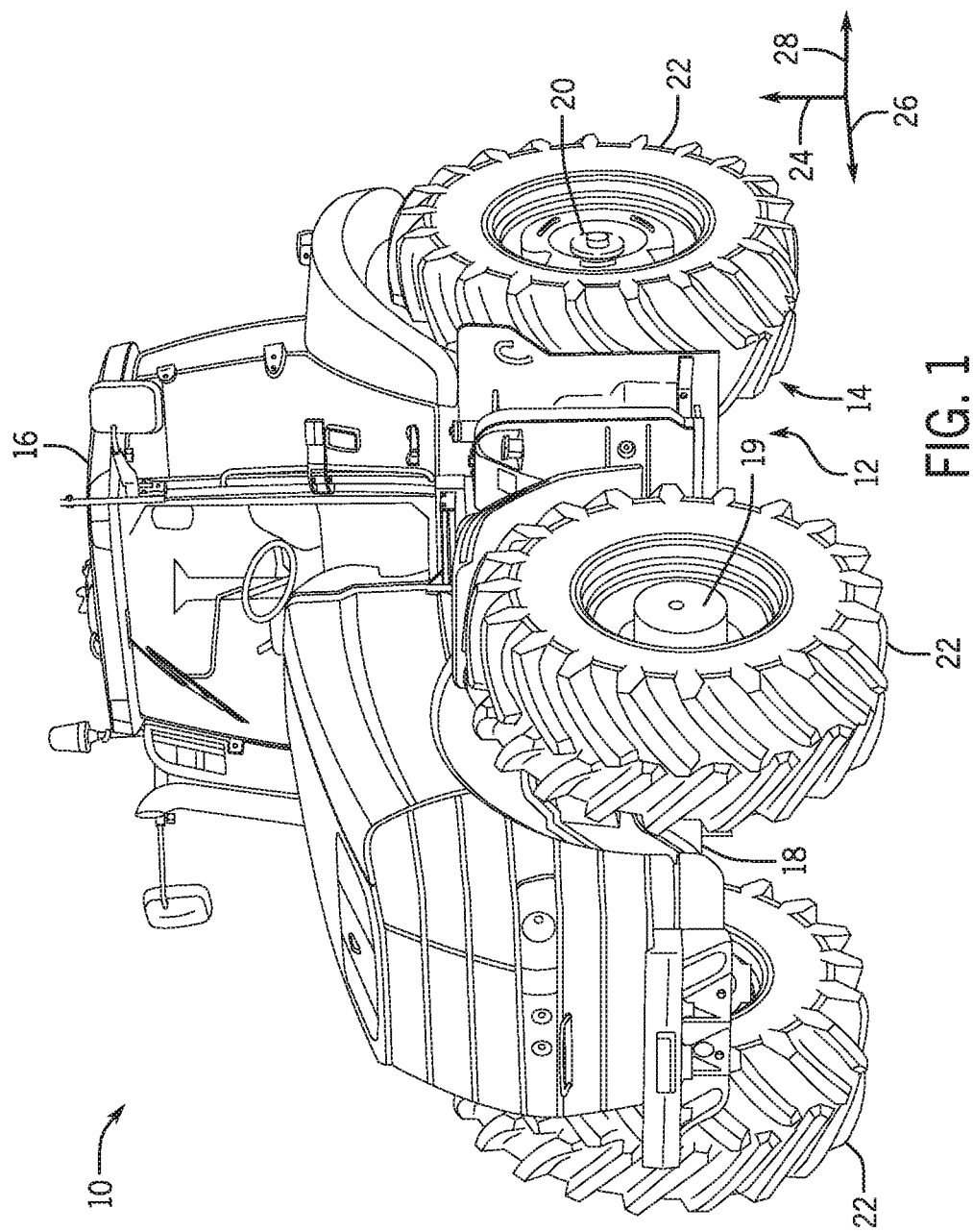
FIG. 1 is a perspective view of an embodiment of a work vehicle having a suspension system.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Certain embodiments of the present disclosure include a sealing system for a moving shaft (e.g., an axle bar). Certain work vehicles are configured to travel across various types of terrain, including terrain with uneven surfaces. Certain work vehicles have suspensions that enable the work vehicles to travel across the various types of terrain. Accordingly, a sealing system for a suspension system is described herein that enables the suspension system to remain substantially sealed as the work vehicle traverses the various types of terrain. As an axle bar of the suspension rotates and pivots relative to an axle housing of the suspension, the sealing system may substantially maintain a seal at the axle bar. In certain embodiments, the sealing system includes a boot, a seal guide coupled to the boot, and a shaft seal coupled to the seal guide. As the axle bar of the suspension rotates and pivots, the shaft seal substantially maintains the seal at the axle bar. In certain embodiments, as the axle bar pivots, the seal guide pivots with the axle bar while the shaft seal substantially maintains the seal at the axle bar.

While primarily described herein in relation to a suspension system for a work vehicle, the sealing system may be included in any suitable application with a moving, rotating, and/or pivoting shaft. For example, agricultural implements, consumer vehicles, industrial vehicles, industrial machinery, recreational machinery, and other suitable vehicles and machinery with a moving, rotating, and/or pivoting shaft may include the sealing system. The sealing system may substantially maintain the seal at the shaft during the moving, the rotating, and/or the pivoting of the shaft.

With the foregoing in mind, the present embodiments relating to sealing systems may be utilized with any rotating and/or pivoting shaft (e.g., an axle bar of a work vehicle). For example, FIG. 1 is a perspective view of an embodiment of a work vehicle 10 having a suspension system 12 and a sealing system 14. In certain embodiments, the suspension system 12 may include the sealing system 14. To facilitate discussion, the work vehicle 10 and certain components of the work vehicle 10 may be described with reference to a vertical axis or direction 24, a longitudinal axis or direction 26, and a lateral axis or direction 28. In the illustrated embodiment, the work vehicle 10 is a tractor that may be coupled to and configured to tow one or more agricultural implements. In certain embodiments, the work vehicle 10 may be an on-road vehicle, a skid steer, or another suitable type of vehicle with a suspension system.

In the illustrated embodiment, the work vehicle 10 includes a body 18 configured to house a motor, a transmission, other systems of the work vehicle 10, or a combination thereof. Additionally, the work vehicle 10 includes a cab 16 configured to house an operator. Moreover, the work vehicle 10 includes vehicle wheels, including front wheels 19 and rear wheels 20, at least some of which may be driven by a drive system coupled to the motor and/or the transmission, thereby driving the work vehicle 10 along a field, a road, or any other suitable surface. Each of the front wheels 19 and the rear wheels 20 are coupled to a respective tire 22. The operator may steer the work vehicle 10 by manipulating or providing an input to a hand controller within the cab 16. The hand controller may be a steering wheel. However, the work vehicle 10 may be steered by any suitable controlling device, such as an electronic (e.g., automatic) controlling device located within the work vehicle 10 or remote from the work vehicle 10. Additionally, the operator may slow or stop the work vehicle 10 by manipulating or providing an input to a brake pedal. Furthermore, the work vehicle 10 may be remotely controlled and/or operated autonomously. While the sealing system 14 is illustrated as employed on a tractor, the sealing system 14 may be employed on any other work vehicle, agricultural implement, or other agricultural equipment having a rotating and a pivoting shaft.

As described herein, the sealing system 14 is configured to substantially maintain a seal of the suspension system 12 as the work vehicle 10 traverses a surface. The surface may include various types of terrain. For example, the surface may be an uneven surface and/or may include sand, mud, rocks, grass, hills, valleys, other types of terrain, or a combination thereof. An axle bar (e.g., a moving shaft) of the suspension system 12 may be configured to pivot generally about the longitudinal axis 26 relative to a frame of the work vehicle 10 to enable the work vehicle 10 to more smoothly and efficiently traverse these various types of terrain. As the axle bar pivots and rotates, the sealing system 14 may substantially maintain a seal at the axle bar.

Figure 2:
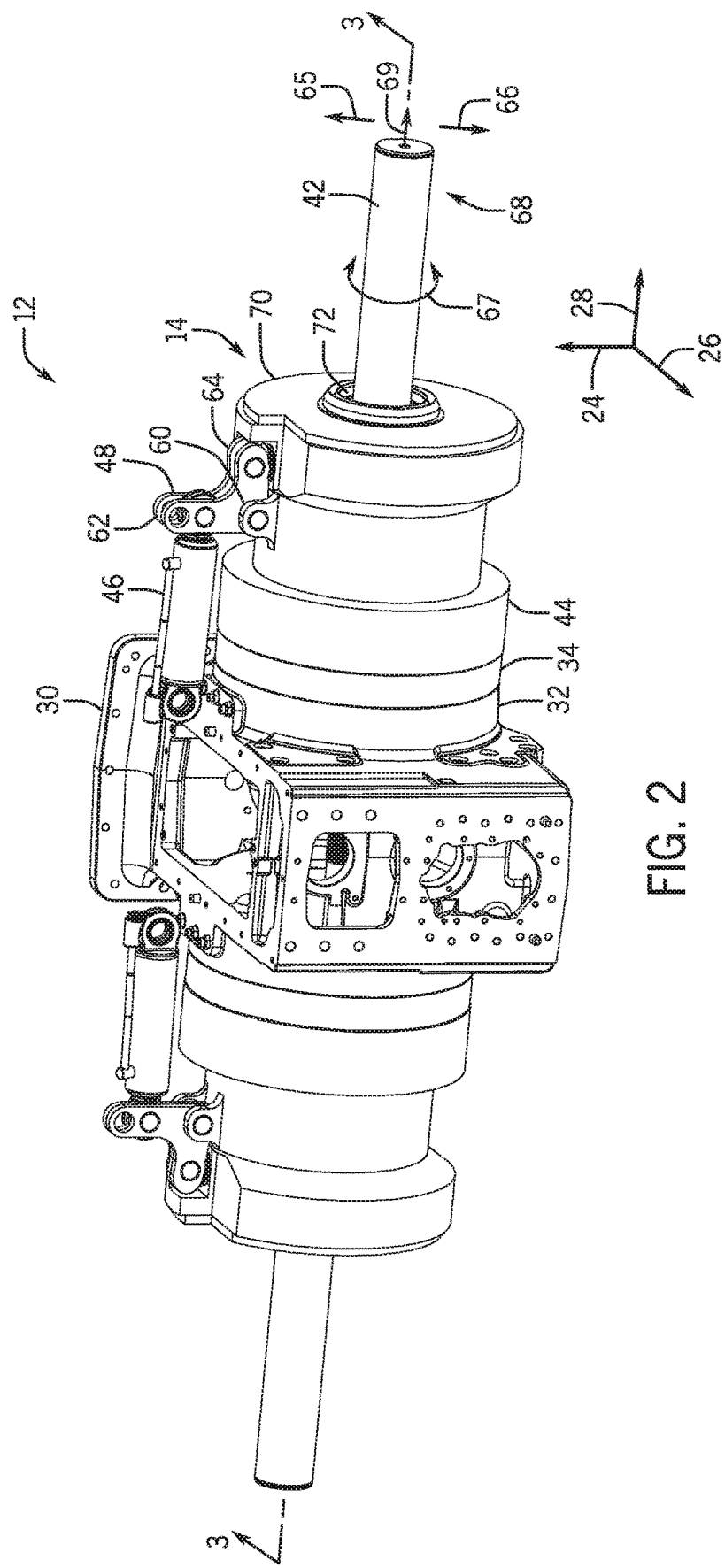
FIG. 2 is a perspective view of an embodiment of a suspension system and a sealing system that may be employed in the work vehicle of FIG. 1.

FIG. 2 is a perspective view of an embodiment of the suspension system 12 and the sealing system 14 that may be employed in the work vehicle of FIG. 1. The suspension system 12 may be employed in a rear portion of the work vehicle and may be coupled to rear wheels of the work vehicle. In certain embodiments, the suspension system 12 or portions of the suspension system 12 may be employed in a front portion of the work vehicle and may be coupled to front wheels of the work vehicle. The suspension system 12 may also be coupled to other wheels of the work vehicle.

In the illustrated embodiment, the suspension system 12 includes a sealing system 14, differential housing 30, an inner housing member 32, a gear housing 34, and a suspension subassembly 40. The suspension subassembly 40 may include an axle bar 42 (e.g., a moving shaft), an axle housing 44, a suspension cylinder 46, a bell crank 48, or a combination thereof. In certain embodiments, the suspension subassembly 40 includes the sealing system 14. The sealing system 14 includes the axle housing 44, a shaft seal plate 70, and a shaft seal 72. In certain embodiments, the suspension system 12, the sealing system 14, and/or the suspension subassembly 40 may include other and/or additional components.

The differential housing 30 houses a differential of the suspension system 12. The differential may include various gears configured to translate a motion of a drive shaft to the axle bar 42. For example, in certain embodiments, the drive shaft may be disposed along and/or parallel to the longitudinal axis 26 and may be coupled to the differential adjacent to or within the differential housing 30. The drive shaft may translate motion and power generated by an engine of the work vehicle to the differential. For example, a first end of the drive shaft may be coupled to the engine (e.g., via a transmission), and a second end of the drive shaft may be coupled to gears of the differential. The engine may rotate the drive shaft which may rotate the gears of the differential.

In certain embodiments, the gears of the differential may be coupled to a gear system. For example, a sun shaft of the gear system may be coupled to the gears of the differential and may be driven to rotate as the gears of the differential rotate. Rotation of the sun shaft may drive rotation of planetary gears of the gear system. Rotation of the planetary gears may drive rotation of a planetary carrier which may rotate the axle bar 42 of the suspension system 12. As such, the power generated by the engine may be transferred to the axle bar 42 via the drive shaft, the differential, and the gear system, thereby driving the axle bar 42 to rotate. The sealing system 14 may substantially maintain a seal at the axle bar 42 as the axle bar 42 rotates.

As illustrated, the inner housing member 32 is coupled to the differential housing 30 and the gear housing 34. The inner housing member 32 may house portions of the gear system. For example, the inner housing member 32 may house portions of the sun shaft and/or other portions of the gear system.

As illustrated, the gear housing 34 is coupled to the inner housing member 32 and the axle housing 44. The gear housing 34 houses a portion of the gear system (e.g., a portion of the sun shaft, the planetary gears, the planetary carrier, and a ring gear). In certain embodiments, the gear housing 34 may house all of the gear system. Further, one or more seals may be disposed between the differential housing 30 and the inner housing member 32, between the inner housing member 32 and the gear housing 34, between the gear housing 34 and the axle housing 44, or a combination thereof. Additionally, in some embodiments, the differential housing 30, the inner housing member 32, the gear housing 34, the axle housing 44, or a combination thereof, may be a single component.

As illustrated, the axle housing 44 is coupled to the gear housing 34 and the shaft seal plate 70. The axle housing 44 houses an inner control member, a slide housing, and an outer control member. In certain embodiments, the axle housing 44 may house other and/or additional components. The suspension subassembly 40 includes the axle housing 44, the inner control member, the slide housing, the outer control member. In certain embodiments, the suspension subassembly 40 may include other and/or additional components.

As illustrated, the shaft seal plate 70 is coupled to the axle housing 44 and the shaft seal 72. The shaft seal plate 70 provides an interface for the shaft seal 72 to couple to other components of the suspension system 12 (e.g., to the axle housing 44). In certain embodiments, the shaft seal plate 70 may be omitted such that the shaft seal 72 couples directly to the axle housing 44 or the outer control member. The axle bar 42 protrudes through the shaft seal plate 70 and the shaft seal 72. As the axle bar 42 pivots and rotates, the shaft seal 72 substantially maintains a seal at an interface of the axle bar 42 and the shaft seal plate 70.

As illustrated, the bell crank 48 is coupled to the axle housing 44 at a pivot point 60 of the bell crank 48, to the suspension cylinder 46 at a first end 62 of the bell crank 48, and to a connecting rod at a second end 64 of the bell crank 48. The connecting rod may be coupled to the slide housing at a first end of the connecting rod and to the bell crank 48 at a second end of the connecting rod. In certain embodiments, the bell crank 48 rotates about the pivot point 60. For example, as the axle bar 42 pivots, the slide housing moves within the axle housing 44. As the slide housing moves, the connecting rod moves generally along the vertical axis 24. The movement of the connecting rod causes the bell crank 48 to rotate about the pivot point 60.

The suspension cylinder 46 is coupled to the bell crank 48 at a first end of the suspension cylinder 46 and to a portion of the work vehicle frame at a second end of the suspension cylinder 46. In certain embodiments, the second end of the suspension cylinder 46 may be coupled to the differential housing 30, which is coupled to the work vehicle frame. As the bell crank 48 rotates about the pivot point 60, the suspension cylinder 46 compresses or extends depending on the movement of the bell crank 48 and the axle bar 42. As illustrated, the suspension cylinder 46 is a hydraulic cylinder configured to selectively compress and extend. In certain embodiments, the suspension cylinder 46 may be a pneumatic cylinder, a spring, or another suspension component configured to absorb energy associated with the axle bar 42 pivoting.

As illustrated, the axle bar 42 is configured to generally pivot along an upward direction 65 and a downward direction 66 and generally rotate along a rotational direction 67. Each of the upward direction 65 and the downward direction 66 are generally along the vertical axis 24, and the rotational direction 67 is generally about a rotational axis 69 of the axle bar 42. The rotational axis 69 extends along and/or parallel to the lateral axis 28. As a wheel end 68 of the axle bar 42 pivots generally downwardly in the downward direction 66 (e.g., away from the suspension cylinder 46), the slide housing and the connecting rod also move generally downwardly in the downward direction 66. The second end 64 of the bell crank 48 is pulled downwardly by the connecting rod. As such, the bell crank 48 rotates about the pivot point 60, such that the first end 62 moves away from the suspension cylinder 46. The rotation of the bell crank 48 causes the suspension cylinder 46 to extend. The extension of the suspension cylinder 46 dissipates a portion of the energy associated with the axle bar 42 pivoting generally downwardly in the downward direction 66.

In another example, as the wheel end 68 of the axle bar 42 pivots about the longitudinal axis 26 and generally upwardly in the upward direction 65 (e.g., toward the suspension cylinder 46), the slide housing and the connecting rod also move generally upwardly in the upward direction 65. The second end 64 of the bell crank 48 is pushed upwardly by the connecting rod. As such, the bell crank 48 rotates about the pivot point 60, such that the first end 62 moves toward the suspension cylinder 46. The rotation of the bell crank 48 causes the suspension cylinder 46 to compress. The compression of the suspension cylinder 46 dissipates a portion of the energy associated with the axle bar 42 pivoting generally upwardly in the upward direction 65.

As illustrated, the suspension cylinder 46 extends generally along the lateral axis 28. However, in certain embodiments, the suspension cylinder 46 may extend generally along the vertical axis 24 or in an orientation generally between the vertical axis 24 and the lateral axis 28, and may be configured to absorb energy associated with the pivoting of the axle bar 42.

Figure 3:
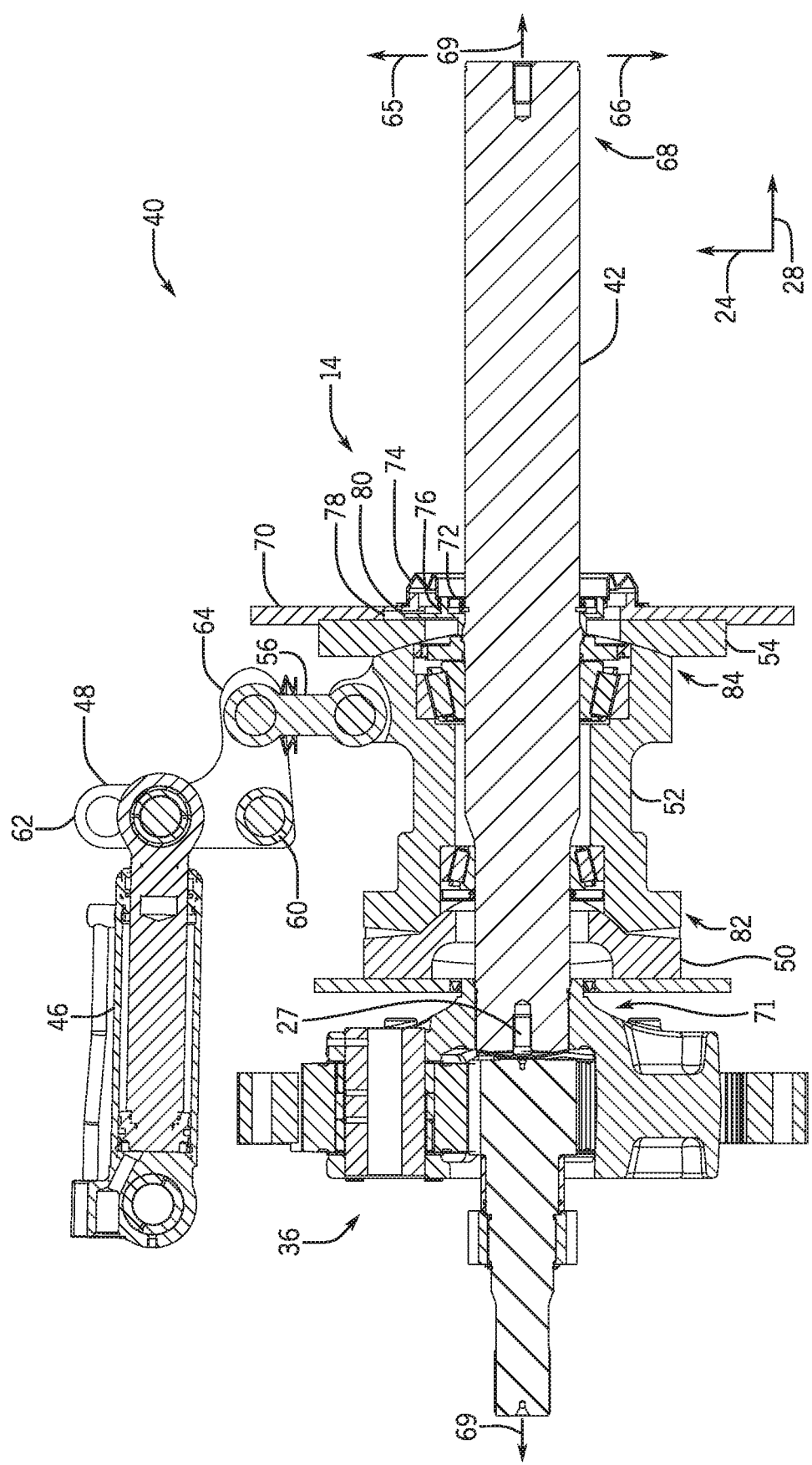
FIG. 3 is a cross-sectional view of a suspension subassembly of the suspension system of FIG. 2 and a sealing system of the suspension system of FIG. 2, taken along line 3-3 of FIG. 2.

FIG. 3 is a cross-sectional view of the suspension subassembly 40 and the sealing system 14 of the suspension system of FIG. 2, taken along line 3-3 of FIG. 2. As illustrated, the suspension subassembly 40 includes the axle bar 42, the suspension cylinder 46, the bell crank 48, inner control member 50, slide housing 52, outer control member 54, and connecting rod 56. The sealing system 14 includes the shaft seal plate 70, the shaft seal 72, a boot 74, a seal guide 76, and a tab 80. A guide slot 78 is formed in the shaft seal plate 70. In certain embodiments, the suspension subassembly 40 may include all or portions of the sealing system 14. In the illustrated embodiment, the suspension subassembly 40 includes a planetary gear system 36.

A differential may drive gears of the planetary gear system 36 to rotate. As illustrated, the planetary gear system 36 is coupled to the axle bar 42 at a gear end 71 of the axle bar 42. The rotation of the gears of the planetary gear system 36 rotates the axle bar 42 about the rotational axis 69. The axle bar 42 may be coupled a wheel at the wheel end 68 of the axle bar 42. As such, the axle bar 42 may drive the wheel to rotate as the planetary gear system 36 drives the axle bar 42 to rotate.

The axle bar 42 is also configured to pivot about the pivot point 27 while rotating. The slide housing 52 is configuring to pivot with the axle bar 42 about the pivot point 27. The inner control member 50 and the outer control member 54 are fixed relative to the axle housing. For example, the inner control member 50 and the outer control member 54 may be rigidly coupled to the axle housing.

The inner control member 50 and the outer control member 54 are configured to control the pivoting motion of the slide housing 52 about the pivot point 27. As illustrated, the inner control member 50, a first end 82 and a second end 84 of the slide housing 52, and the outer control member 54 extend generally concentrically about a pivoting axis of the axle bar 42. The pivoting axis of the axle bar 42 extends along and/or parallel to the longitudinal axis. As the axle bar 42 pivots about the pivot point 27, the first end 82 of the slide housing 52 may move along the inner control member 50, and the second end 84 of the slide housing 52 may move along the outer control member 54. The inner control member 50 and the outer control member 54 may at least partially control and/or guide the pivoting movement of the slide housing 52. For example, the inner control member 50 and the outer control member 54 may control movement along vertical axis 24, the longitudinal axis 26, and the lateral axis 28.

As the axle bar 42 and the slide housing 52 pivot about the pivot point 27, the connecting rod 56 drives the bell crank 48 to rotate, thereby compressing or extending the suspension cylinder 46. For example, an upward movement of the slide housing 52 drives the connecting rod 56 generally upwardly along the vertical axis 24. The upward movement of the connecting rod 56 drives the bell crank 48 to rotate about the pivot point 60, thereby moving the first end 62 toward the suspension cylinder 46. The rotation of the bell crank 48 drives the suspension cylinder 46 to compress. As such, the suspension cylinder 46 may compress as the wheel end 68 of the axle bar 42 and the slide housing 52 pivot generally upwardly along the vertical axis 24 and in the upward direction 65. The compression of the suspension cylinder 46 enables the suspension cylinder 46 to absorb energy associated with the upward movement of the wheel end 68 of the axle bar 42.

In certain embodiments, the axle bar 42 and the slide housing 52 may pivot such that the wheel end 68 of the axle bar 42 moves generally downwardly along the vertical axis 24. As the slide housing 52 is pivoted generally downwardly away from the suspension cylinder 46, the connecting rod 56 may be driven downwardly. The downward movement of the connecting rod 56 may drive the bell crank 48 to rotate about the pivot point 60, thereby moving the first end 62 away from the suspension cylinder 46. The rotation of the bell crank 48 drives the suspension cylinder 46 to expand. As such, the suspension cylinder 46 may expand as the axle bar 42 and the slide housing 52 pivot generally downward and away from the suspension cylinder 46. The expansion of the suspension cylinder 46 enables the suspension cylinder 46 to absorb energy associated with the downward movement of the wheel end 68 of the axle bar 42.

As the axle bar 42 rotates and pivots, the sealing system 14 is configured to substantially maintain a seal at the axle bar 42. The seal guide 76 is coupled to the shaft seal 72 and to the boot 74. The boot 74 is also coupled to the shaft seal plate 70. In certain embodiments, the boot 74 may be coupled to the outer control member 54 and/or the axle housing. In the illustrated embodiment, the axle bar 42 protrudes through the shaft seal 72, the boot 74, and the seal guide 76. The shaft seal 72 is configured to contact the axle bar 42. Each of the shaft seal 72, the boot 74 and the seal guide 76 are annular about the axle bar 42 and the rotational axis 69. As the axle bar 42 pivots, the seal guide 76 moves with the axle bar 42, and the shaft seal 72 and the boot 74 substantially maintain a seal at the axle bar 42.

As the axle bar 42 rotates about the rotational axis 69, the sealing system 14 is blocked from rotating with the axle bar 42. For example, the guide slot 78 and the tab 80 are configured to block rotation of the seal guide 76 as the axle bar 42 rotates. As illustrated, the guide slot 78 extends generally along the vertical axis 24 into the shaft seal plate 70 and adjacent to the outer control member 54. In certain embodiments, the guide slot 78 may extend into the axle housing, the outer control member 54, the shaft seal plate 70, in a direction other than along the vertical axis 24, or a combination thereof. The tab 80 extends into the guide slot 78. As the axle bar 42 rotates, the tab 80 contacts one longitudinal side of the guide slot 78. The contact between the longitudinal side of the guide slot 78 and the tab 80 blocks the rotation the sealing system 14. For example, the contact between the longitudinal side of the guide slot 78 and the tab 80 block rotation of the shaft seal 72. Because the shaft seal 72 is semi-rigidly coupled to the boot 74 and the seal guide 76, each of the shaft seal 72, the boot 74, and the seal guide 76 are blocked from rotating with the axle bar 42. Further, the tab 80 may move generally upwardly and downwardly within the guide slot 78 as the axle bar 42 pivots. As the tab 80 moves with the guide slot 78 and while the sealing system 14 is prevented from rotating with the axle bar 42, the shaft seal 72 substantially maintains the seal at the axle bar 42. As such, the sealing system 14 may substantially maintain the seal at the axle bar 42 while the axle bar 42 pivots and/or rotates.

Figure 4:
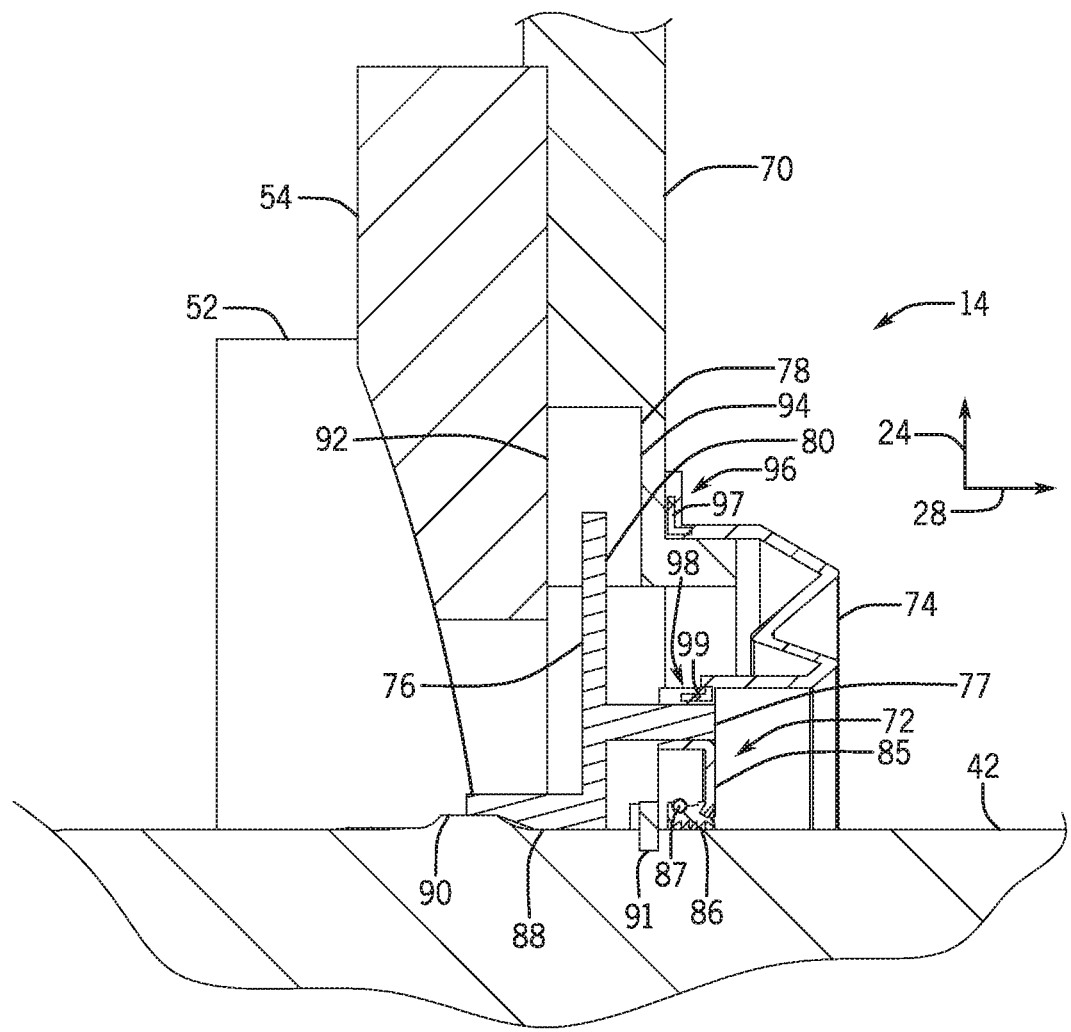
FIG. 4 is a cross-sectional view of an embodiment of the sealing system of FIG. 2.

FIG. 4 is a cross-sectional view of an embodiment of the sealing system 14. The sealing system 14 includes the shaft seal plate 70, the shaft seal 72, the boot 74, the seal guide 76, the tab 80, a seal guide bushing 88, and an annular protrusion 90. In certain embodiments, the sealing system 14 may include the axle bar 42, the slide housing 52, the outer control member 54, the axle housing, or a combination thereof. As illustrated, the boot 74 is coupled to the shaft seal plate 70 and the seal guide 76. However, in certain embodiments, the boot 74 may be coupled to the outer control member 54, the axle housing, the shaft seal plate 70, the shaft seal 72, the seal guide 76, or a combination thereof.

As illustrated, the boot 74 is coupled to the shaft seal plate 70 and the seal guide 76 via a press fit. A first end 96 of the boot 74 includes a first metal component 97 configured to be press fit to the shaft seal plate 70. A second end 98 of the boot 74 includes a second metal component 99 configured to be press fit to the seal guide 76. Each of the boot 74, the first end 96, the first metal component 97, the second end 98, and the second metal component 99 are annular about the rotational axis of the axle bar 42. In certain embodiments, the first metal component 97 and/or the second metal component 99 may be press fit at only certain portions along the boot 74. In some embodiments, the boot 74 may be coupled to the shaft seal plate 70, the seal guide 76, and/or other components of the sealing system 14 via other connection devices (e.g., via fastener(s)). As the axle bar 42 pivots, the seal guide 76 may pivot generally with the axle bar 42 about the pivot point. The boot 74 is configured to flex as the seal guide 76 and the axle bar 42 pivot. The boot 74 is also configured to seal an area between the shaft seal plate 70 and the seal guide 76 while the axle bar 42 pivots and rotates.

As illustrated, the seal guide 76 includes a seal guide extension 77 that is coupled to the boot 74 and the shaft seal 72. In certain embodiments, the seal guide 76 may be coupled to other components of the sealing system 14 (e.g., the slide housing 52). The seal guide 76 includes the tab 80 that extends into the guide slot 78. The seal guide 76 is configured to move with the axle bar 42 as the axle bar 42 pivots. For example, as the axle pivots, the tab 80 may move generally upwardly and downwardly along the vertical axis 24 in the guide slot 78. In certain embodiments, the tab 80 may move in the guide slot 78 as the axle bar 42 pivots without contacting a first lateral side 92 and a second lateral side 94 of the guide slot 78. As illustrated, the guide slot 78 extends a first distance along the lateral axis 28 between the first lateral side 92 and the second lateral side 94. The tab 80 extends a second distance along the lateral axis 28. The first distance is greater than the second distance such that the tab 80 moves freely along the lateral axis 28 within the guide slot 78. As such, the seal guide 76 may move with the axle bar 42 as the axle bar 42 pivots without contacting the first lateral side 92 or the second lateral side 94.

As illustrated, the seal guide 76 includes a seal guide bushing 88. The axle bar 42 includes an annular protrusion 90, and an axle extension 91 extends from the axle bar 42. The seal guide bushing 88 interfaces with the annular protrusion 90 to block movement of the seal guide 76 in a first direction along the lateral axis 28. For example, the seal guide bushing 88 and the annular protrusion 90 may block movement of the seal guide 76 along the axle bar 42 toward the slide housing 52. Interaction between the seal guide bushing 88 and the axle extension 91 may block movement of the seal guide 76 in a second direction along the lateral axis 28 (e.g., along the axle bar 42 away from the slide housing 52). As such, the seal guide 76 may remain in an area generally between the annular protrusion 90 and the axle extension 91 as the axle bar 42 pivots and rotates.

The shaft seal 72 is configured to substantially maintain a seal at the axle bar 42 as the axle bar 42 pivots and rotates. As illustrated, the shaft seal 72 includes a shaft seal extension 85, a seal 86, and a spring 87. In certain embodiments, the shaft seal 72 may include other and/or additional components. The components of the shaft seal 72 (e.g., the shaft seal extension 85, the seal 86, and the spring 87) are annular about the axle bar 42 and the rotational axis of the axle bar 42. The shaft seal extension 85 is coupled to the seal guide extension 77 and the seal 86. The shaft seal extension 85 may be coupled to the seal guide extension 77 via a press fit or by other connection means (e.g., fastener(s)). The shaft seal extension 85 extends between the seal guide extension 77 and the axle bar 42. The seal 86 is coupled to the shaft seal extension 85 and the spring 87. The seal 86 is configured to contact the axle bar 42 and to substantially maintain a seal at the axle bar 42 as the axle bar 42 is stationary, pivots, and rotates. For example, the spring 87 is configured to resiliently bias the seal 86 against the axle bar 42. The bias against the axle bar 42 may enable the seal 86 to substantially maintain a seal.

Figure 5:
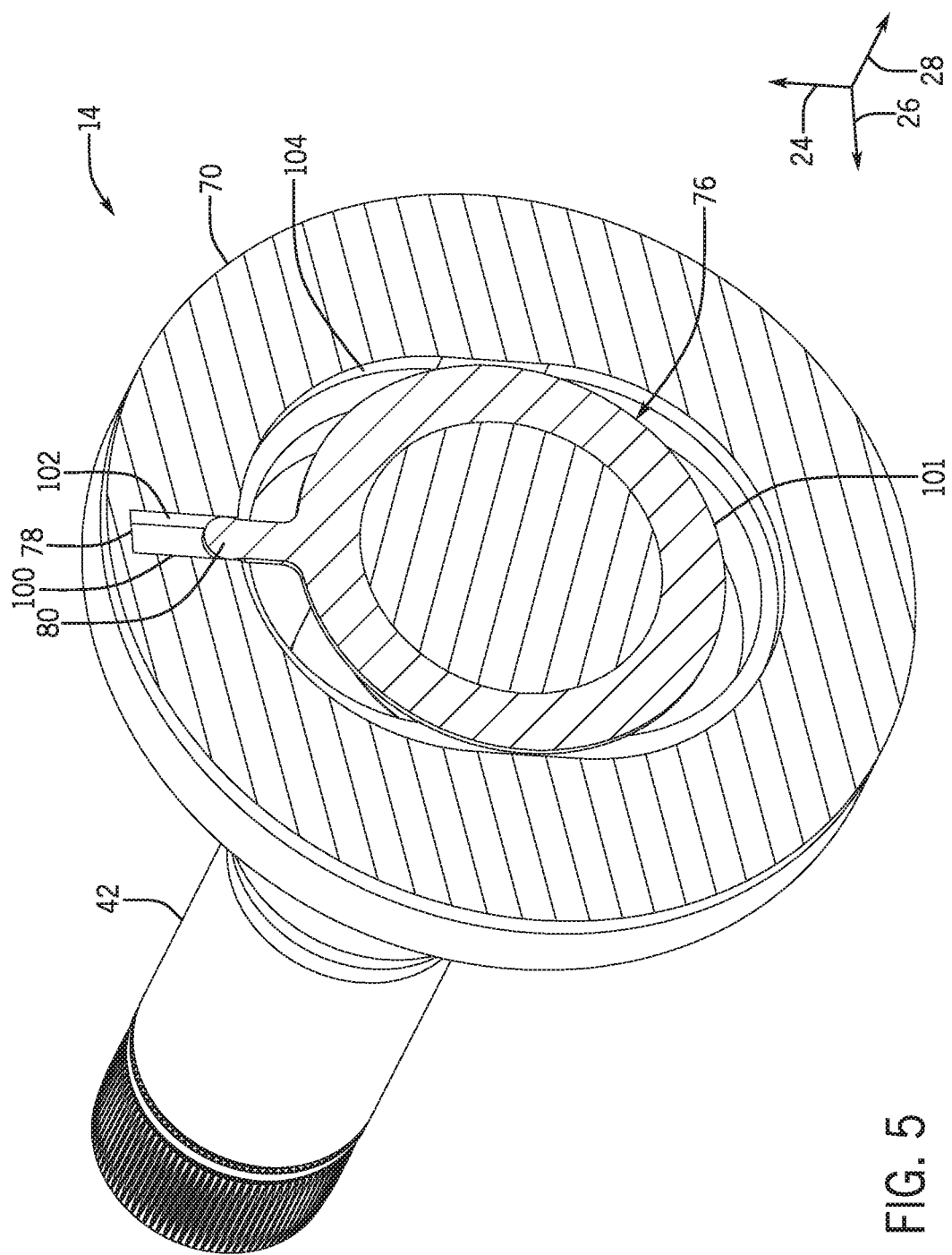
FIG. 5 is a perspective cross-sectional view of an embodiment of a seal guide and a shaft seal plate that may be employed within the sealing system of FIG. 4.

FIG. 5 is a perspective cross-sectional view of an embodiment of a shaft seal plate 70 and a seal guide 76 that may be employed within the sealing system 14. In the illustrated embodiment, the sealing system 14 includes the shaft seal plate 70 and the seal guide 76. The seal guide 76 includes the tab 80 configured to extend into the guide slot 78. As illustrated, the guide slot 78 is formed within the shaft seal plate 70. However, in certain embodiments, the guide slot may be formed in another component of the sealing system 14, the suspension subassembly, or the work vehicle. The seal guide 76 includes a ring 101 that extends annularly about a circumference of the axle bar 42 (e.g., about the rotational axis of the axle bar 42). The tab 80 extends from the ring 101 and into the guide slot 78.

The guide slot 78 is configured to block rotational movement of the tab 80 and the ring 101 generally about the lateral axis 28 as the axle bar 42 rotates. For example, the guide slot 78 includes a first circumferential surface 100 and a second circumferential surface 102. The tab 80 may contact the first circumferential surface 100 or the second circumferential surface 102 as the axle bar 42 rotates. This blocks rotation of the seal guide 76, the shaft seal, and the boot as the axle bar 42 rotates. As described herein, the guide slot 78 may include the first lateral side and the second lateral side that enable the tab 80 to move freely in the guide slot 78 along the lateral axis 28 as the axle bar 42 pivots. As such, the tab 80 may move freely along the lateral axis 28 and may contact the first circumferential surface 100 or the second circumferential surface 102 as the tab 80 moves along the longitudinal axis 26.

As illustrated, the shaft seal plate 70 includes a slot 104 that enables the seal guide 76 to move generally vertically along the vertical axis 24 as the axle bar 42 pivots. As the axle bar 42 pivots, the ring 101 moves generally vertically within the slot 104, and the tab 80 moves generally vertically within the guide slot 78. As the ring 101 and the tab 80 move generally along the vertical axis 24, the sealing system 14 substantially maintains the seal at the axle bar 42.

Figure 6:
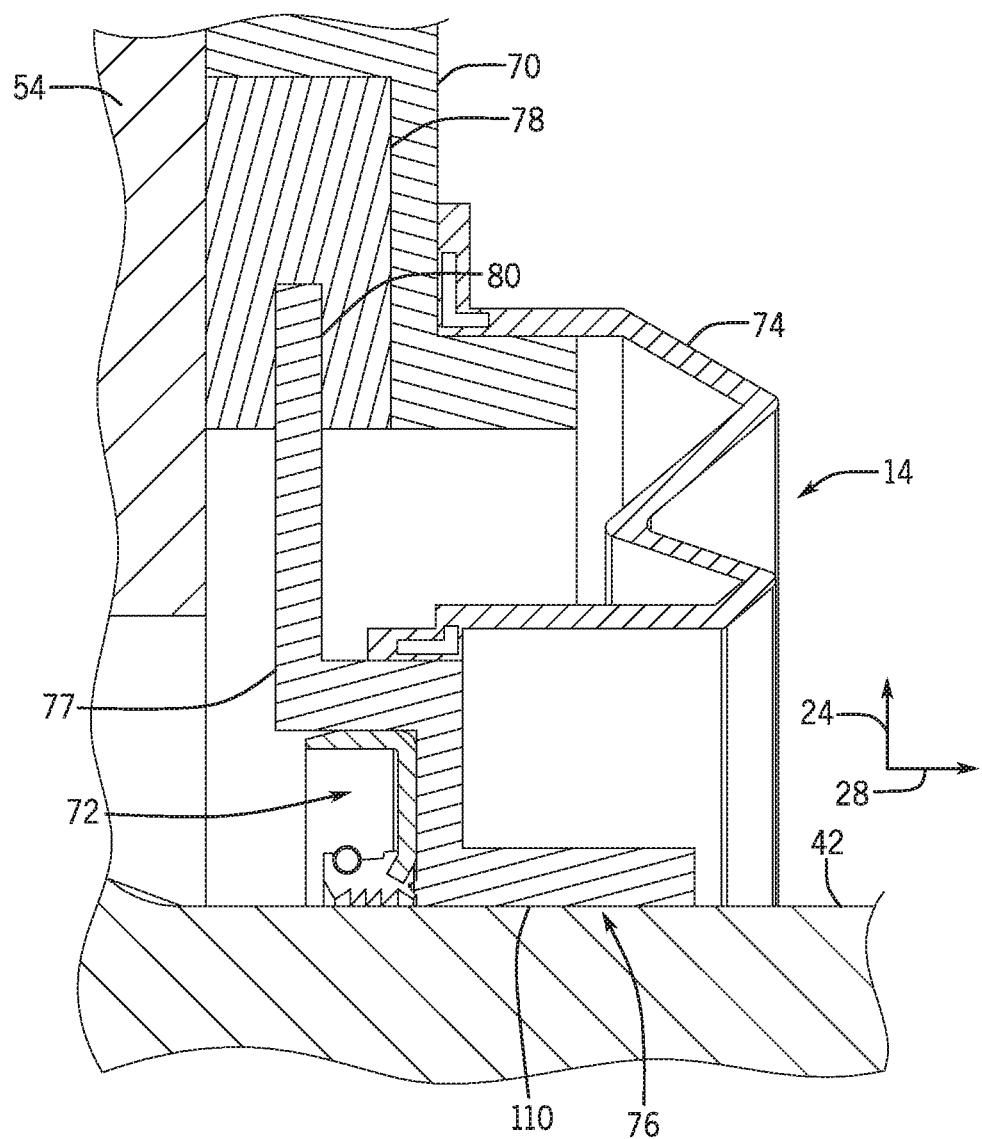
FIG. 6 is a cross-sectional view of an embodiment of a sealing system that may be employed in the suspension system of FIG. 2.

FIG. 6 is a cross-sectional view of an embodiment of the sealing system 14 that may be employed in the suspension system of FIG. 2. As illustrated, the sealing system 14 includes the shaft seal 72, the boot 74, and the seal guide 76. The seal guide 76 includes the tab 80 that extends into the guide slot 78. In the illustrated embodiment, the seal guide extension 77 extends generally along the lateral axis 28. The boot 74 is coupled to the seal guide extension 77 at an exterior of the seal guide 76, and the shaft seal 72 is coupled to the seal guide extension 77 at an interior of the seal guide 76. As such, the seal guide extension 77 extends between the shaft seal 72 and the boot 74. The shaft seal 72 is configured to substantially maintain a seal at the axle bar 42 as the axle bar 42 pivots and rotates. The boot 74 is configured to flex as the axle bar 42 pivots and is configured to seal an area between the shaft seal plate 70 and the seal guide 76.

As illustrated, the seal guide 76 includes a seal guide axle extension 110. The seal guide axle extension 110 extends along the axle bar 42 and along the lateral axis 28. The seal guide axle extension 110 is configured to interface with the axle bar 42. For example, a lubricant may be disposed between the seal guide axle extension 110 and the axle bar 42. Because the seal guide 76 is blocked from rotating with the axle bar 42 (e.g., due to the tab 80 within the guide slot 78), the seal guide axle extension 110 remains stationary relative to the rotation of the axle bar 42. In certain embodiments, the seal guide axle extension 110 may substantially a seal at the axle bar 42. As such, the illustrated embodiment of the sealing system 14 is configured to maintain the seal at the axle bar 42, via the shaft seal 72 and/or via the seal guide axle extension 110, as the axle bar 42 pivots and rotates.

The sealing system described herein enables a suspension system to remain sealed as an axle bar of the suspension system rotates and pivots. For example, a work vehicle including the sealing system may substantially maintain a seal at an axle bar as the work vehicle traverses terrain with an uneven surface. The axle bar and a slide housing coupled to the axle bar may pivot as the work vehicle travels over such a surface, and the sealing system may substantially maintain the seal at the axle bar as the axle bar pivots and rotates. A suspension cylinder coupled to the slide housing may extend and compress as the axle bar and the slide housing pivot. The suspension cylinder may absorb energy associated with the pivoting of the axle bar. As such, the suspension system may efficiently absorb the energy associated with the work vehicle traveling across terrain with the uneven surface. In this manner, the suspension system may enable the work vehicle to more smoothly travel across the terrain and may enhance a user's experience while operating the work vehicle. Additionally, the ability of the suspension system to more efficiently absorb such energy may prevent other portions of the work vehicle from absorbing the energy. As such, a working life of the other portions of the work vehicle may be extended. While the axle bar pivots and rotates, the sealing system may substantially maintain the seal at the axle bar.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:
1. A sealing system, comprising:
  a shaft seal plate, wherein a guide slot is formed in the shaft seal plate;

a seal guide comprising a tab and a seal guide extension, wherein the tab extends in a first direction into the guide slot and the seal guide extension extends in a second direction that is substantially perpendicular to the first direction;

a shaft seal coupled to the seal guide extension, wherein the shaft seal is configured to form and substantially maintain a seal at an axle bar as the axle bar rotates and pivots, the seal guide is configured to translate relative to the shaft seal plate as the axle bar pivots, and the tab is configured to block rotation of the seal guide and the shaft seal relative to the shaft seal plate as the axle bar rotates; and a boot comprising a first end statically attached to the shaft seal plate and a second end statically attached to the seal guide extension, wherein the seal guide extension is positioned between the second end of the boot and the shaft seal along the first direction.

2. The sealing system of claim 1, wherein the boot is configured to flex as the seal guide translates relative to the shaft seal plate, and the boot is configured to form and substantially maintain a seal between the seal guide and the shaft seal plate.

3. The sealing system of claim 1, wherein the boot is statically attached to the shaft seal plate and to seal guide via press fits.

4. The sealing system of claim 1, wherein the shaft seal plate is configured to be rigidly coupled to a frame.

5. The sealing system of claim 1, comprising a lubricant disposed between the seal guide and the axle bar.

6. The sealing system of claim 1, wherein the shaft seal plate, the seal guide, and the shaft seal are configured to be annularly disposed about the axle bar.

7. The sealing system of claim 1, wherein the tab of the seal guide is configured to move within the guide slot as the axle bar pivots.

8. A suspension system, comprising:
an axle housing; and
a sealing system, comprising:
a shaft seal plate coupled to the axle housing, wherein a guide slot is formed between the shaft seal plate and the axle housing;
a seal guide comprising a tab and a seal guide extension, wherein the tab extends in a first direction into the guide slot and the seal guide extension extends in a second direction that is substantially perpendicular to the first direction;
a shaft seal coupled to the seal guide extension, wherein the shaft seal is configured to form and substantially maintain a seal at an axle bar of the suspension system as the axle bar rotates and pivots, the seal guide is configured to translate relative to the shaft seal plate as the axle bar pivots, and the tab is configured to block rotation of the seal guide and the shaft seal relative to the shaft seal plate as the axle bar rotates; and
a boot comprising a first end statically attached to the shaft seal plate and a second end statically attached to the seal guide extension,
wherein the seal guide extension is positioned between the second end of the boot and the shaft seal along the first direction.

9. The suspension system of claim 8, wherein the guide slot is formed between a first circumferential surface and a second circumferential surface of the shaft seal plate.

10. The suspension system of claim 9, wherein the tab is configured to contact at least one of the first circumferential surface and the second circumferential surface to block rotation of the seal guide and the shaft seal relative to the shaft seal plate as the axle bar rotates.

11. The suspension system of claim 8, wherein the shaft seal comprises a shaft seal extension, a seal, and a spring.

12. The suspension system of claim 11, wherein the spring is configured to resiliently bias the seal against the axle bar.

13. The suspension system of claim 8, comprising a lubricant disposed between the seal guide and the axle bar.

14. A sealing system for a suspension system, comprising:
a shaft seal plate, wherein a guide slot is formed within the shaft seal plate;
a seal guide comprising a tab, a seal guide extension, and a seal guide bushing, wherein the tab is configured to extend in a first direction into the guide slot and the seal guide extension extends in a second direction that is substantially perpendicular to the first direction;
a shaft seal coupled to the seal guide extension, wherein the shaft seal is configured to form and substantially maintain a seal at an axle bar of the suspension system as the axle bar rotates and pivots, the seal guide is configured to translate relative to the shaft seal plate as the axle bar pivots, the tab is configured to block rotational movement of the seal guide and the shaft seal relative to the shaft seal plate as the axle bar rotates, and the seal guide bushing is configured to block lateral movement of the seal guide along the axle bar via contact with an annular protrusion of the axle bar; and
a boot comprising a first end statically attached to the shaft seal plate and a second end statically attached to the seal guide extension,
wherein the seal guide extension is positioned between the second end of the boot and the shaft seal along the first direction.

15. The sealing system of claim 14, wherein the shaft seal plate, the seal guide, and the shaft seal are configured to be annularly disposed about the axle bar.

16. The sealing system of claim 14, wherein the boot is configured to flex as the seal guide translates relative to the shaft seal plate, and the boot is configured to form and substantially maintain a seal between the seal guide and the shaft seal plate.

17. The sealing system of claim 14, wherein the seal guide comprises a ring configured to be disposed about a circumference of the axle bar, and the tab extends from the ring.

18. The sealing system of claim 14, wherein the shaft seal plate is configured to be rigidly coupled to an axle housing of the suspension system.

* * * * *